No. 867,245. PATENTED OCT. 1, 1907.
B. H. CONFER & J. W. WOODLING.
CHECK VALVE.
APPLICATION FILED MAR. 6, 1905.
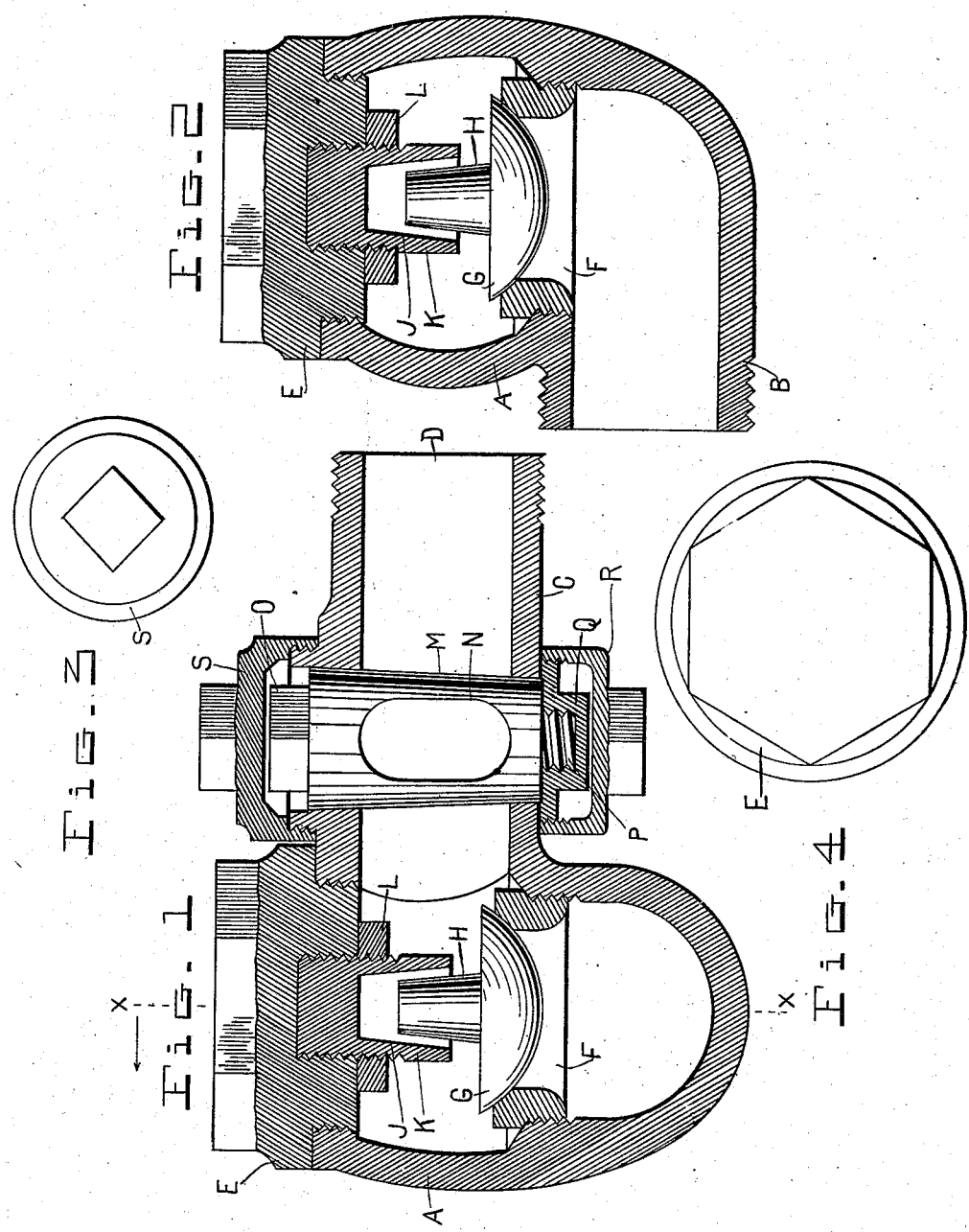
WITNESSES:
S. Olivia Moore
Richard C. Balinger.
INVENTORS.
Benjaman H. Confer
John W. Woodling
By Edwin Guthrie
Attorney.

UNITED STATES PATENT OFFICE.

BENJAMAN H. CONFER AND JOHN W. WOODLING, OF ALBION, PENNSYLVANIA.

CHECK-VALVE.

No. 867,245.　　　　　Specification of Letters Patent.　　　　　Patented Oct. 1, 1907.

Application filed March 6, 1905. Serial No. 248,591.

*To all whom it may concern:*

Be it known that we, BENJAMAN H. CONFER and JOHN W. WOODLING, citizens of the United States, residing at Albion, in the county of Erie and State of Pennsylvania, have invented certain new and useful Improvements in Check-Valves, of which the following is a specification.

Our invention relates to check valves, and more especially to that type of devices adapted to permit the flow of fluid or gas under pressure in one direction, while preventing the flow in the opposite direction, the device for accomplishing that purpose being associated with a cut-off valve in the same valve casing. The reason for the introduction of the cut-off valve is to allow the check valve to be re-seated or repaired in any way without disconnecting it, and without blowing off the steam from, for example, a boiler to which the check valve permits the passage of water. Thus, assuming the check valve to be attached to the boiler of a locomotive engine and that in the ordinary course it becomes worn at the seat, or the valve itself is abraded by sand in the water, in order to fully repair the check valve it is necessary only to close the cut-off valve. The check valve may then be taken apart without interference with the operation of the boiler in any respect.

The object of our invention is to produce a check valve of the nature mentioned having a cut-off valve of special construction and arrangement, provided with particularly formed elements by which the cut-off valve is secured in position with respect to the casing, and protected against accidental displacement from the outside.

In the accompanying drawings, throughout which like letters refer to like parts, Figure 1 represents a longitudinal vertical section, and Fig. 2 is a vertical cross section of our invention on line X—X of Fig. 1. Fig. 3 is a top plan of the screw cap of the check valve, and Fig. 4 is a top plan of the screw-cap of the cut-off valve.

In the drawings letter A marks the valve casing common to both the check valve and to the cut-off valve. The casing has an inlet fitting B to which a water service pipe may be joined, and a lateral extension C, at the end of which is the outlet D that may be coupled to the boiler fitting. That portion of the casing A which incloses the check valve is closed at the top by the screw plug E, that ordinarily possesses a polygonal head in order that it may be engaged by a wrench, see Fig. 4. Within the casing the check valve seat is designated by letter F, and it will be observed, is adjustable by reason of its threaded connection with the interior of the casing.

The check valve is itself marked G. It is in form a portion of a sphere, and may, therefore, fit the seat F in whatever position it may happen to drop upon it. The seat and valve being ground to correspond in the usual manner. Valve G is provided with a frusto-conical stem H, and this stem is arranged to enter the socket J of the adjustable thimble K, whenever the valve lifts. The socket guides the rise and fall of the valve. Here it will be observed that the thimble K has a threaded engagement with a suitably threaded cavity in the screw plug E, and that it may be by reason of such engagement raised or lowered with respect to the valve G. Thus, the lift of the valve is set at a greater or less amount, and, after the thimble K has been adjusted as desired, it is locked in that position by the annular jam nut L. It is believed to be also clear that whatever the lift of the valve, it will always drop back upon its seat in a position to fit it and absolutely prevent any return of fluid which has once passed. Furthermore, it is thought to be now apparent from the above description and from the drawings that all parts of the check valve are readily accessible by taking out the screw plug E.

To allow the dismantling of the check valve at all times independent of the boiler pressure, we introduce in the extension C of the casing A the plug cut-off M having the port N. The plug M may be turned by its squared head O, see Fig. 1, and it is kept in place by means of the base nut Q, shown in Fig. 1 as screwed to the lower threaded end P of the plug cut-off M. It is our practice for safety and to prevent the accumulated dust and dirt from interfering with the operation of cut-off valve M to cover the base nut Q with a screw cap R and to similarly protect the head O by the screw cap S. It is not absolutely necessary to so protect the base and head of the cut-off valve, but it is the preferred manner of construction and perfectly insures the good working order of the cut-off valve at all times and under all conditions. A further office of cap R is that, as it may be tightly set up against the casing extension C as drawn in Fig. 1, it locks the plug M either closed as illustrated or in its open position turned half way around from that shown. The plug may be, therefore, prevented from being accidentally turned thus closing or opening the passage when not desired.

We are aware that check valves have been constructed associated with cut-off valves, and we do not claim that feature.

Having thus described our invention and explained the mode of its operation, what we claim is—

1. The combination with a valve casing, of a tapering plug valve, a nut engaging the smaller end of the said valve, the said nut having external threads, and a screw cap engaging the external threads of the nut and entirely covering the nut and the end of said valve and arranged to bear against the said casing whereby the said valve is held against rotary displacement, substantially as described.

2. The combination with a check-valve having a casing provided with a lateral extension, of a plug cut-off valve situated in the lateral extension of the casing, a removable cap adapted to cover the head of said plug, a nut Q engaging the base of said plug, and a screw cap engaging the said nut and arranged to be screwed against the casing to protect and lock the said plug, substantially as described.

3. The combination with a check-valve having a casing provided with a lateral extension, of a plug cut-off valve situated in the lateral extension of the casing, the base nut Q engaging the end of the plug, and a screw cap engaging the base nut and arranged to be screwed against the casing to protect and lock the plug, substantially as described.

In testimony whereof we affix our signatures in presence of two witnesses.

BENJAMAN H. CONFER.
JOHN W. WOODLING.

Witnesses:
J. M. RANDALL,
FRED WRIGHT.